US012496746B2

(12) United States Patent
Fukuzawa et al.

(10) Patent No.: US 12,496,746 B2
(45) Date of Patent: Dec. 16, 2025

(54) STRAND MANUFACTURING APPARATUS AND PELLET MANUFACTURING APPARATUS

(71) Applicant: THE JAPAN STEEL WORKS, LTD., Tokyo (JP)

(72) Inventors: Yohei Fukuzawa, Tokyo (JP); Yusuke Fukushi, Tokyo (JP); Hideki Tomiyama, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 0 days.

(21) Appl. No.: 18/665,913

(22) Filed: May 16, 2024

(65) Prior Publication Data

US 2024/0300146 A1   Sep. 12, 2024

Related U.S. Application Data

(62) Division of application No. 17/065,502, filed on Oct. 7, 2020, now Pat. No. 12,030,223.

(30) Foreign Application Priority Data

Oct. 18, 2019   (JP) ................................. 2019-191188

(51) Int. Cl.
*B29B 9/06*   (2006.01)
*B29C 48/05*   (2019.01)
(Continued)

(52) U.S. Cl.
CPC .............. *B29B 9/065* (2013.01); *B29C 48/05* (2019.02); *B29C 48/255* (2019.02); *B29C 48/92* (2019.02)

(58) Field of Classification Search
CPC ... B29C 48/05; B29C 48/255; B29C 48/2552; B29C 48/2554; B29C 2948/92133;
(Continued)

(56) References Cited

U.S. PATENT DOCUMENTS 6,020,277 A * 2/2000 Jameson ................. B29C 48/05
                                                        428/401
7,569,617 B2 * 8/2009 Mukaide .................. C08J 11/10
                                                        521/40.5
(Continued)

FOREIGN PATENT DOCUMENTS

CN   102431177 A   5/2012
CN   204136407 U   2/2015
(Continued)

OTHER PUBLICATIONS

English Translation for JP 2002-79568 (Year: 2002).*
(Continued)

*Primary Examiner* — Seyed Masoud Malekzadeh
(74) *Attorney, Agent, or Firm* — Potomac Law Group, PLLC

(57) ABSTRACT

A strand manufacturing apparatus capable of reducing variations among diameters of resin strands without stopping the operation of an extruder is provided. A strand manufacturing apparatus includes a die in which an outflow hole for discharging a resin material contained in an extruder as a string-shaped resin strand is formed, an adjustment valve configured to adjust opening of the outflow hole, an image acquisition unit configured to acquire an image of the resin strand extruded from the outflow hole, a diameter acquisition unit configured to acquire a diameter of the resin strand in the image, and an opening adjustment unit configured to adjust the opening by driving the adjustment valve based on the diameter of the resin strand acquired by the diameter acquisition unit.

1 Claim, 15 Drawing Sheets

(51) Int. Cl.
    *B29C 48/255* (2019.01)
    *B29C 48/92* (2019.01)
(58) Field of Classification Search
    CPC .......... B29C 2948/92152; B29C 2948/92619;
            B29C 2948/92647; B29B 9/06; B29B
            9/065
    See application file for complete search history.

(56) References Cited

U.S. PATENT DOCUMENTS

| | | | |
|---|---|---|---|
| 10,982,084 B1 * | 4/2021 | Wu | C08F 14/18 |
| 11,110,629 B2 * | 9/2021 | Shinohara | C08J 3/12 |
| 12,214,537 B2 * | 2/2025 | Takeuchi | B29B 7/726 |
| 2003/0232176 A1 * | 12/2003 | Polk, Jr. | B29C 48/92 |
| | | | 428/167 |
| 2004/0241386 A1 * | 12/2004 | Polk, Jr. | B29C 48/12 |
| | | | 428/113 |
| 2004/0253429 A1 * | 12/2004 | Polk, Jr. | B29C 48/001 |
| | | | 428/292.1 |
| 2007/0243282 A1 | 10/2007 | Kikusawa | |
| 2009/0283203 A1 * | 11/2009 | Marchini | B29C 48/92 |
| | | | 156/117 |
| 2012/0070615 A1 | 3/2012 | Shi et al. | |
| 2012/0126466 A1 | 5/2012 | Tajiri | |
| 2013/0154142 A1 * | 6/2013 | Ripple | B29C 48/19 |
| | | | 425/379.1 |
| 2013/0207302 A1 * | 8/2013 | Cernohous | B29C 45/0005 |
| | | | 264/257 |
| 2017/0254937 A1 | 9/2017 | Nakahori et al. | |
| 2018/0147768 A1 | 5/2018 | Ito et al. | |
| 2019/0315017 A1 * | 10/2019 | Sakurai | B29B 9/06 |
| 2020/0406504 A1 * | 12/2020 | Shinohara | B29C 48/05 |

FOREIGN PATENT DOCUMENTS

| | | | | |
|---|---|---|---|---|
| CN | 209095950 U | | 7/2019 | |
| DE | 202006018456 U1 | | 3/2007 | |
| DE | 102010027817 A1 | | 11/2011 | |
| DE | 202016003742 U1 | | 7/2016 | |
| EP | 0418681 A1 | | 9/1990 | |
| EP | 4234205 A2 | | 8/2023 | |
| JP | H03110119 A | | 5/1991 | |
| JP | H4-348911 A | | 12/1992 | |
| JP | H06234149 A | * | 8/1994 | ............ B29C 48/92 |
| JP | H8-299881 | | 11/1996 | |
| JP | 2002079568 A | * | 3/2002 | ............ B29C 48/92 |
| JP | 2003165847 A | | 6/2003 | |
| JP | 2010188546 A | | 9/2010 | |
| JP | 2013233702 A | | 11/2013 | |
| JP | 2017173168 A | * | 9/2017 | |
| JP | 2017196875 A | * | 11/2017 | ............... B29B 9/06 |
| JP | 2018-001649 A | | 1/2018 | |
| JP | 2018089794 A | | 6/2018 | |
| WO | WO 2010/140310 A1 | | 12/2010 | |
| WO | 2016/043117 A1 | | 3/2016 | |

OTHER PUBLICATIONS

English Translation for JP 2017-173168 (Year: 2017).*
English Translation for JP 2017-196875 (Year: 2017).*
English Translation for JP 6-234149 (Year: 1994).*
Office Action issued Oct. 31, 2023, in Chinese Patent Application No. 202011104491.6.
Office Action for Japanese Patent Application No. 2019-191188 issued on May 23, 2023 (includes English language translation).

* cited by examiner

STRAND MANUFACTURING APPARATUS AND PELLET MANUFACTURING APPARATUS

INCORPORATION BY REFERENCE

This application is a divisional of U.S. patent application Ser. No. 17/065,502, filed on Oct. 7, 2020, now issued as U.S. Pat. No. 12,030,223, which is based upon and claims the benefit of priority from Japanese patent application No. 2019-191188, filed on Oct. 18, 2019, the disclosures of both of which are incorporated herein in their entireties by reference.

BACKGROUND

The present disclosure relates to a strand manufacturing apparatus and a pellet manufacturing apparatus.

There is a known technique in which a resin material extruded from an extruder is extruded from outflow holes formed in a die so that string-shaped resin strands are generated, and after the resin strands are cooled and solidified, they are cut into pellets having a certain length. The pellets cut out from the resin strands are used as a material for injection molding or the like. Japanese Unexamined Patent Application Publication No. 2018-001649 (hereinafter referred to as Patent Literature 1) discloses a technique for changing the shape of a flow-path member such as a flow control member called a crown in order to adjust the flow velocity (the extrusion velocity) of the resin extruded from a plurality of nozzle (outflow holes) formed in a die.

SUMMARY

It is important to reduce variations among diameters of resin strands when the resin strands are generated. When there are variations among the diameters of the resin strands, the sizes of pellets cut out from the resin strands vary from one another. For example, in the case where pellets are used as a material for injection molding, if there are variations among the sizes of the pellets, the accuracy of measurement of the pellets deteriorates and hence defective molding occurs. By adjusting the flow velocity of a resin by using the technique disclosed in Patent Literature 1, a flow-path distribution is made uniform, thus making it possible to reduce variations among thicknesses of resin strands. However, according to the technique disclosed in Patent Literature 1, it is necessary to replace the flow-path member such as the crown in order to adjust the flow velocity of the resin extruded from the outflow holes formed in the die. That is, in the technique disclosed in Patent Literature 1, it is necessary to temporarily stop the operation of the extruder and rearrange (or replace) the flow-path member such as the crown in order to adjust the flow velocity of the resin.

Other problems to be solved and novel features will become apparent from descriptions in this specification and accompanying drawings.

A strand manufacturing apparatus according to an embodiment includes: a die in which an outflow hole for discharging a resin material contained in an extruder as a string-shaped resin strand is formed; an adjustment valve configured to adjust opening of the outflow hole; an image acquisition unit configured to acquire an image of the resin strand extruded from the outflow hole; a diameter acquisition unit configured to acquire a diameter of the resin strand in the image; and an opening adjustment unit configured to adjust the opening by driving the adjustment valve based on the diameter of the resin strand acquired by the diameter acquisition unit.

The present disclosure provides a strand manufacturing apparatus capable of reducing variations among diameters of resin strands without stopping the operation of an extruder.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
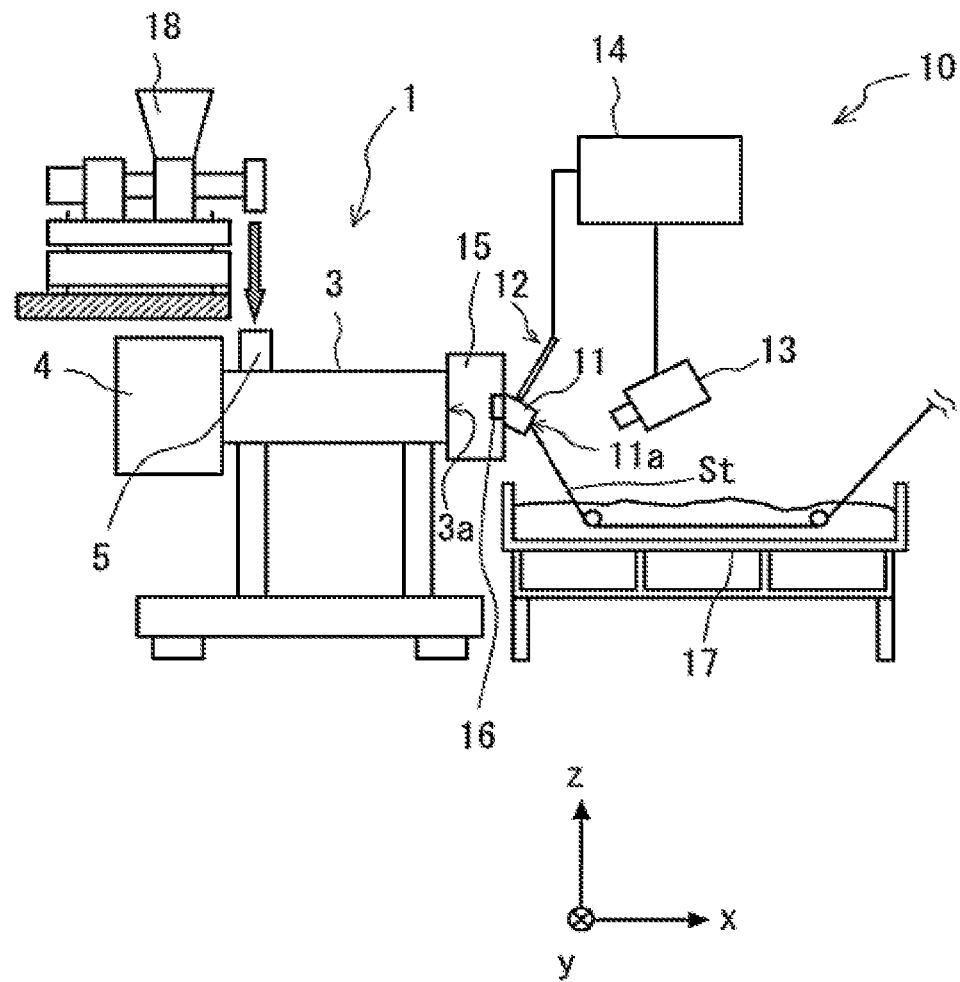
FIG. 1 is a schematic diagram of a configuration of an extruder and a strand manufacturing apparatus according to a first embodiment.

Specific embodiments are explained hereinafter in detail with reference to the drawings. However, the present disclosure is not limited to the below-shown embodiments. Further, the following descriptions and the drawings are simplified as appropriate for clarifying the explanation. Further, the same components are assigned the same symbols and their duplicated explanations are omitted.

In the following embodiments, when necessary, the present disclosure is explained by using separate sections or separate embodiments. However, those embodiments are not unrelated with each other, unless otherwise specified. That is, they are related in such a manner that one embodiment is a modified example, an application example, a detailed example, or a supplementary example of a unit or the whole of another embodiment. Further, in the following embodiments, when the number of elements or the like (including numbers, values, quantities, ranges, and the like) is mentioned, the number is not limited to that specific number except for cases where the number is explicitly specified or the number is obviously limited to a specific number based on its principle. That is, a larger number or a smaller number than the specific number may be also used.

Further, in the following embodiments, their components (including operation steps and the like) are not necessarily indispensable except for cases where the component is explicitly specified or the component is obviously indispensable based on its principle. Similarly, in the following embodiments, when a shape, a position relation, or the like of a component(s) or the like is mentioned, shapes or the likes that are substantially similar to or resemble that shape are also included in that shape except for cases where it is explicitly specified or they are eliminated based on its principle. This is also true for the above-described numbers or the like (including numbers, values, quantities, ranges, and the like). Note that right-handed xyz-coordinate systems shown in the drawings are shown for the sake of convenience to explain positional relations among components. In general, an xy-plane is a horizontal plane and a z-axis positive direction is a vertically upward direction.

First Embodiment

A first embodiment will be described hereinafter with reference to the drawings.

FIG. 1 is a schematic diagram of a configuration of an extruder and a strand manufacturing apparatus according to the first embodiment. The extruder is an apparatus that melts and extrudes a resin raw material. Examples of the resin raw material include various resin materials such as a single-component resin and a multi-component compound. For example, the resin raw material may be polypropylene. As shown in FIG. 1, the extruder 1 includes a cylinder 3 including a screw disposed therein (not shown), and a motor 4 that rotationally drives the screw. The extruder 1 may be a single-screw extruder, or a multi-screw extruder such as a twin-screw extruder. The resin raw material is supplied to a hopper 5 of the extruder 1 through a feeder 18 thereof.

The strand manufacturing apparatus 10 includes a die 11, adjustment valves 12, an image acquisition unit 13, a control unit 14, a die holder 15, a crown (a flow control member) 16, and a cooling tank 17. The die 11 generates (i.e., forms) string-like resin strands from the resin material extruded from the extruder 1. Outflow holes 11a for discharging the resin material in a string shape are formed in the die 11. The die holder 15 that holds the die 11 is disposed between the cylinder 3 of the extruder 1 and the die 11. Further, the crown 16, in which internal flow paths for making the resin flowing out from the die holder 15 flow into the die 11 are formed, is disposed between the die 11 and the die holder 15.

The adjustment valves 12 are provided in order to adjust the opening (i.e., the degree of opening) of the outflow holes 11a formed in the die 11. The adjustment valves 12 are driven by actuators, and the opening of the outflow holes 11a is adjusted according to the moving distances of the actuators. The image acquisition unit 13 acquires an image of resin strands St extruded from the outflow holes 11a. The control unit 14 controls the adjustment valves 12 based on the image acquired by the image acquisition unit 13. The configuration of the control unit 14 will be described later. The cooling tank 17 cools and solidifies (solidification) the resin strands St extruded from the outflow holes 11a.

Figure 2:
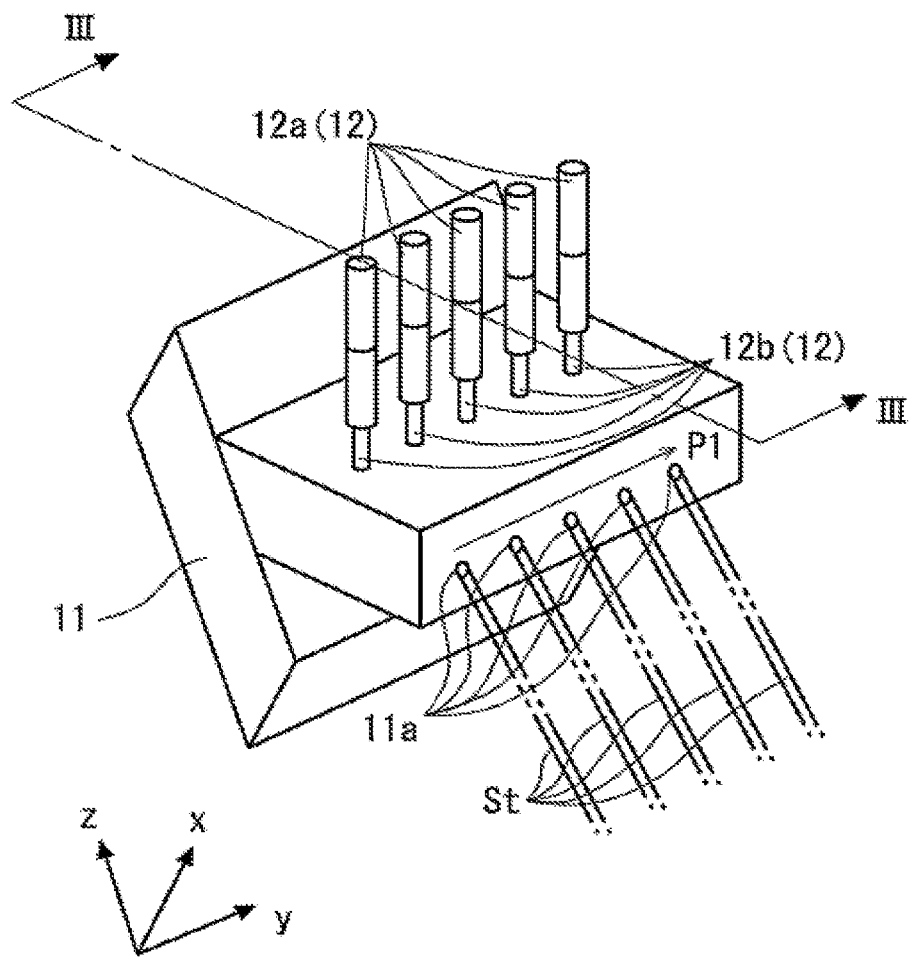
FIG. 2 shows details of a configuration of a die and adjustment valves of the strand manufacturing apparatus according to the first embodiment.
Figure 3:
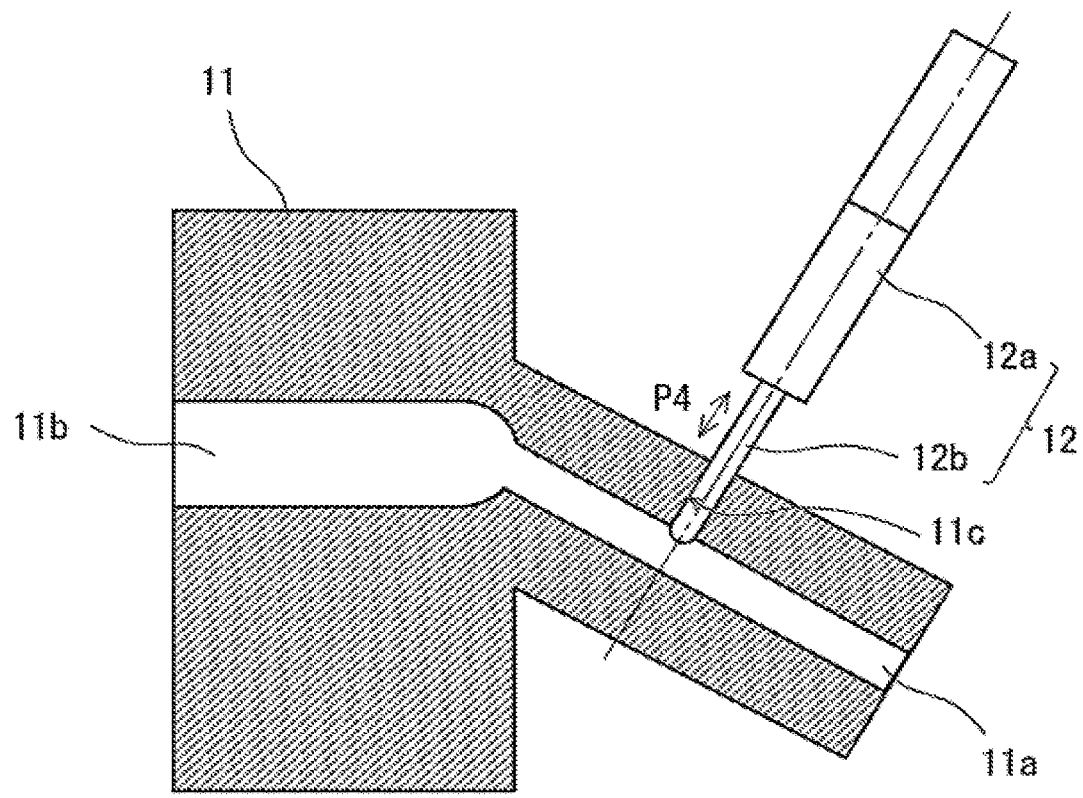
FIG. 3 is a cross-sectional view taken along a line III-III in FIG. 2.

FIG. 2 shows details of the configuration of the die 11 and the adjustment valves 12. FIG. 3 is a cross-sectional view taken along a line III-III in FIG. 2. As shown in FIG. 2, a plurality of outflow holes 11a, which are arranged in a direction indicated by an arrow P1, are formed in the die 11. Note that although the number of outflow holes 11a is five in FIG. 2, the number of outflow holes is not limited to five. The number of outflow holes may be any number no less than two. Further, the outflow holes 11a do not have to be arranged in one row in the die 11. As shown in FIG. 3, flow paths 11b for making the resin material extruded by the extruder 1 flow thereinto and supplying it to the outflow holes 11a are also formed in the die 11.

As shown in FIGS. 2 and 3, each of the adjustment valves 12 includes a linear actuator 12a serving as a driving-source actuator, and a pin 12b functioning as a slider that is linearly moved by the linear actuator 12a. As shown in FIG. 3, pin holes 11c, in which the respective pins 12b are slidably inserted, are formed in the die 11. The pin holes 11c are substantially perpendicular to the outflow holes 11a, and communicate with the outflow holes 11a at the upper parts thereof. By operating the linear actuators 12a, the pins 12b can be linearly moved in a direction indicated by an arrow P4 shown in FIG. 3. That is, the moving distances of the pins 12b change according to the moving distances of the linear actuators 12a, so that the opening of the outflow holes 11a is adjusted. By configuring the adjustment valves 12 as described above, it is possible to accurately adjust the opening of the outflow holes 11a.

Note that in FIGS. 2 and 3, the pins 12b are inserted into the pin holes 11c formed in the die 11. However, other configurations may also be adopted as long as the opening of the outflow holes 11a can be adjusted by the pins 12b. For example, the pins 12b may be disposed at the mouths at the outlet ends of the outflow holes 11a so that the pins 12b function as shutters for adjusting the opening of the outflow holes 11a.

Next, a flow along which the extruder 1 and the strand manufacturing apparatus 10 generate (i.e., form) resin strands from the resin raw material will be described with reference to FIG. 1.

Firstly, the resin raw material is mixed and kneaded by the screw while it is conveyed through the cylinder 3 of the extruder 1. The mixed and kneaded resin material is extruded from the resin outlet 3a of the cylinder 3 into the die holder 15 and supplied to the internal flow paths of the crown 16 through the die holder 15. The resin material supplied to the internal flow paths of the crown 16 further flows from the inlet part of the die 11 into the internal flow paths of the die 11. Then, the resin material is extruded as continuous string-shaped resin strands St from respective outflow holes 11a. The resin strands St are cooled and solidified (solidification) in the cooling tank 17.

Next, the configuration of the control unit 14 will be described.

Figure 4:
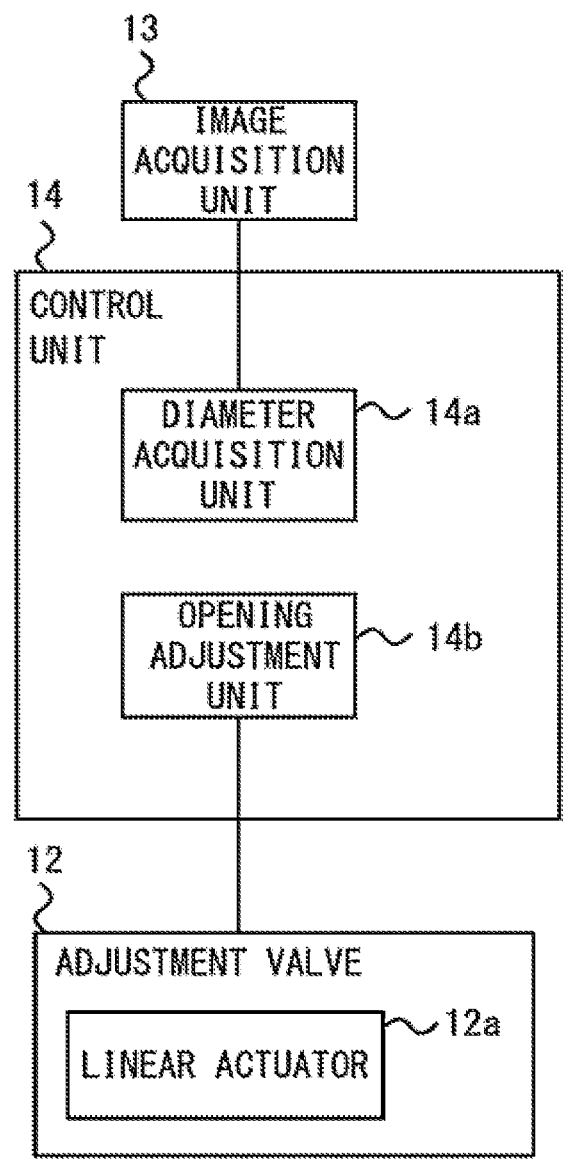
FIG. 4 is a block diagram showing a configuration of a control unit of the strand manufacturing apparatus according to the first embodiment.

FIG. 4 is a block diagram showing the configuration of the control unit 14. As shown in FIG. 4, the control unit 14 includes a diameter acquisition unit 14a and an opening adjustment unit 14b. The diameter acquisition unit 14a acquires the diameters of the resin strands (hereinafter also referred to as strand diameters) in the image. The opening adjustment unit 14b adjusts the opening based on the diameters of the resin strands acquired by the diameter acquisition unit 14a by driving the linear actuators 12a for the adjustment valves 12. Note that in the configuration shown in FIG. 4, the diameter acquisition unit 14a is one of the components of the control unit 14. However, the diameter acquisition unit 14a may be integrated with the image acquisition unit 13 as a single apparatus (or a single unit).

Next, a flow of processes for adjusting the diameters of resin strands will be described. Note that in the following description, FIGS. 1 and 4 are also referred to as required.

Figure 5:
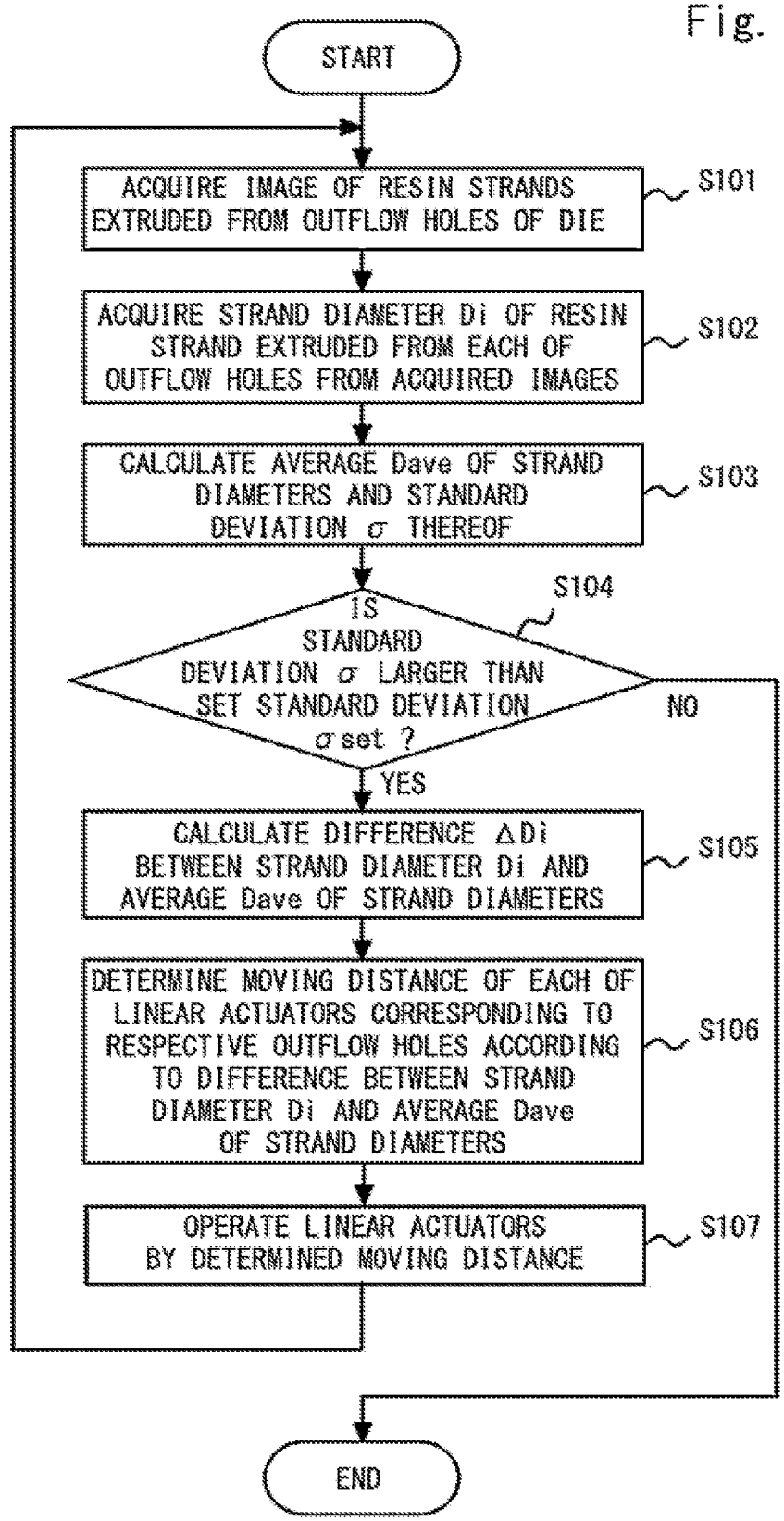
FIG. 5 is a flowchart showing a flow of processes for adjusting the diameters of resin strands in the strand manufacturing apparatus according to the first embodiment.

FIG. 5 is a flowchart showing a flow of processes for adjusting the diameters of resin strands. As shown in FIG. 5, firstly, the image acquisition unit 13 acquires an image of resin strands extruded from the outflow holes 11a of the die 11 (step S101). Next, the diameter acquisition unit 14a acquires the diameter (the strand diameter $D_i$) of a resin strand extruded from each of the outflow holes 11a from the acquired images (step S102). Next, the opening adjustment unit 14b calculates an average $D_{ave}$ of the strand diameters and a standard deviation $\sigma$ thereof (step S103).

Subsequent to the step S103, the opening adjustment unit 14b determines whether or not the calculated standard deviation $\sigma$ is larger than a predefined set standard deviation $\sigma_{set}$ (step S104). When it is determined that the calculated standard deviation $\sigma$ is equal to or smaller than the set standard deviation $\sigma_{set}$ in the step S104, the process is finished.

When it is determined that the calculated standard deviation $\sigma$ is larger than the set standard deviation $\sigma_{set}$ in the step S104, the opening adjustment unit 14b calculates, for each of the resin strands extruded from the respective outflow holes, a difference $\Delta D_i$ between the strand diameter $D_i$ of that resin strand and the average $D_{ave}$ of the strand diameters (step S105). Next, the opening adjustment unit 14b determines a moving distance for each of the linear actuators 12a for the respective outflow holes according to the difference between the strand diameter $D_i$ of the corresponding resin strand and the average $D_{ave}$ of the strand diameters (step S106). Next, the opening adjustment unit 14b operates (i.e., moves) the linear actuators 12a by the determined moving distances (step S107).

Figure 6:
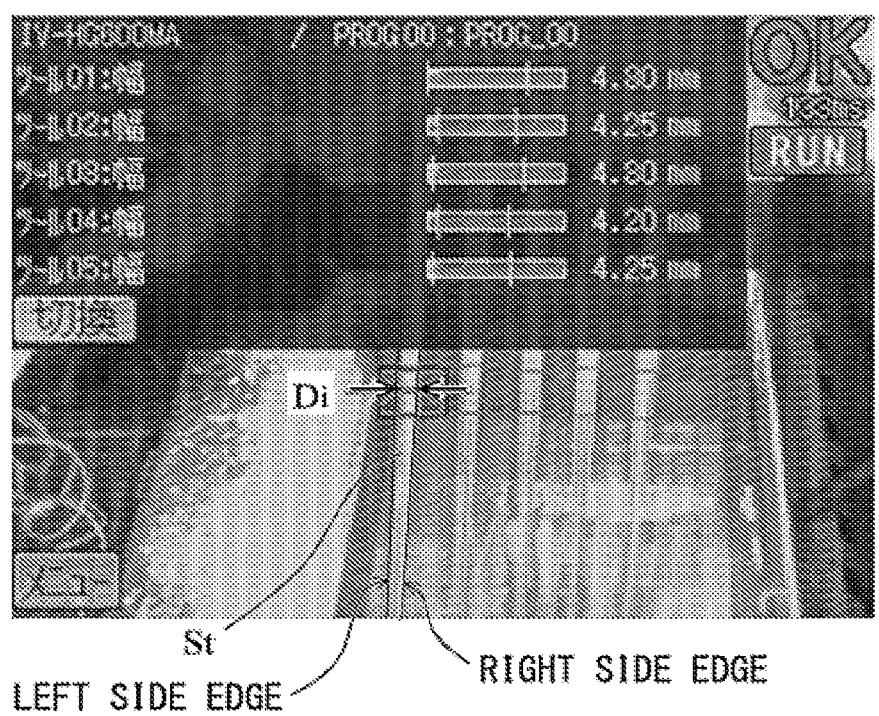
FIG. 6 is a photograph for explaining a process for acquiring the diameters of strands from an acquired image in a step S102 shown in FIG. 5.

FIG. 6 is a photograph for explaining a process for acquiring the strand diameters $D_i$ from an acquired image in the step S102 in FIG. 5. As shown in FIG. 6, the strand diameter is acquired by detecting the right side edge and left side edge of the resin strand St from the acquired image and measuring the width (i.e., the distance) between the right and left side edges. Note that a known edge detection method can be used to detect the right and left side edges of the resin strand St.

Next, an experiment in which the effect of reducing variations among diameters of resin strands extruded from respective outflow holes 11a was verified will be described.

In this experiment, the number of outflow holes 11a formed in the die 11 was five, which is the same as that in the configuration example shown in FIG. 2. Further, the diameter of each of the outflow holes 11a was 4 mm. Polypropylene was used as the raw material for resin strands. Five resin strands St extruded from the outflow holes 11a shown in FIG. 2 are referred to as, from the right to the left, a resin strand St1, a resin strand St2, a resin strand St3, a resin strand St4, and a resin strand St5.

Figure 7:
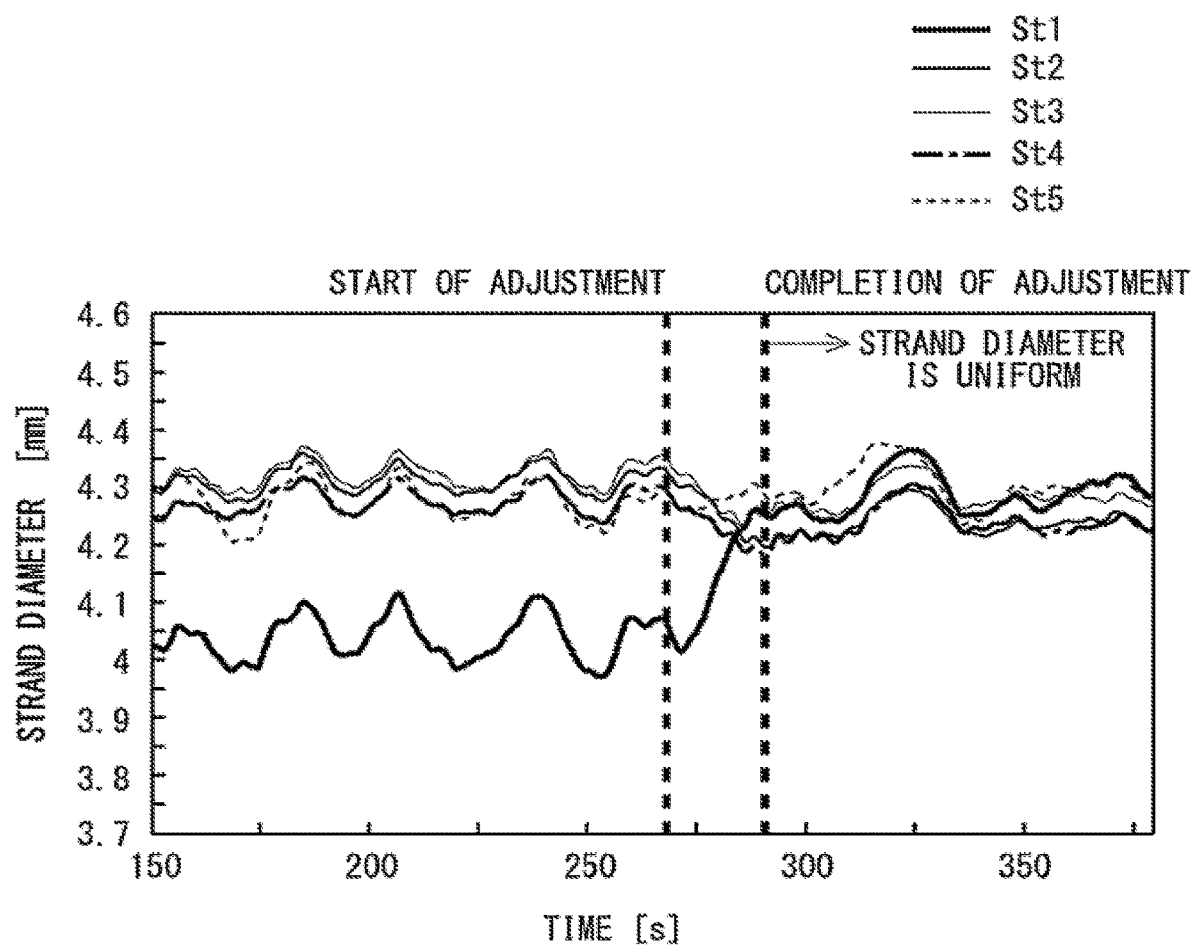
FIG. 7 is a graph showing a result of an experiment in which the effect of reducing variations among diameters of resin strands extruded from respective outflow holes in the strand manufacturing apparatus according to the first embodiment was verified.
Figure 8:
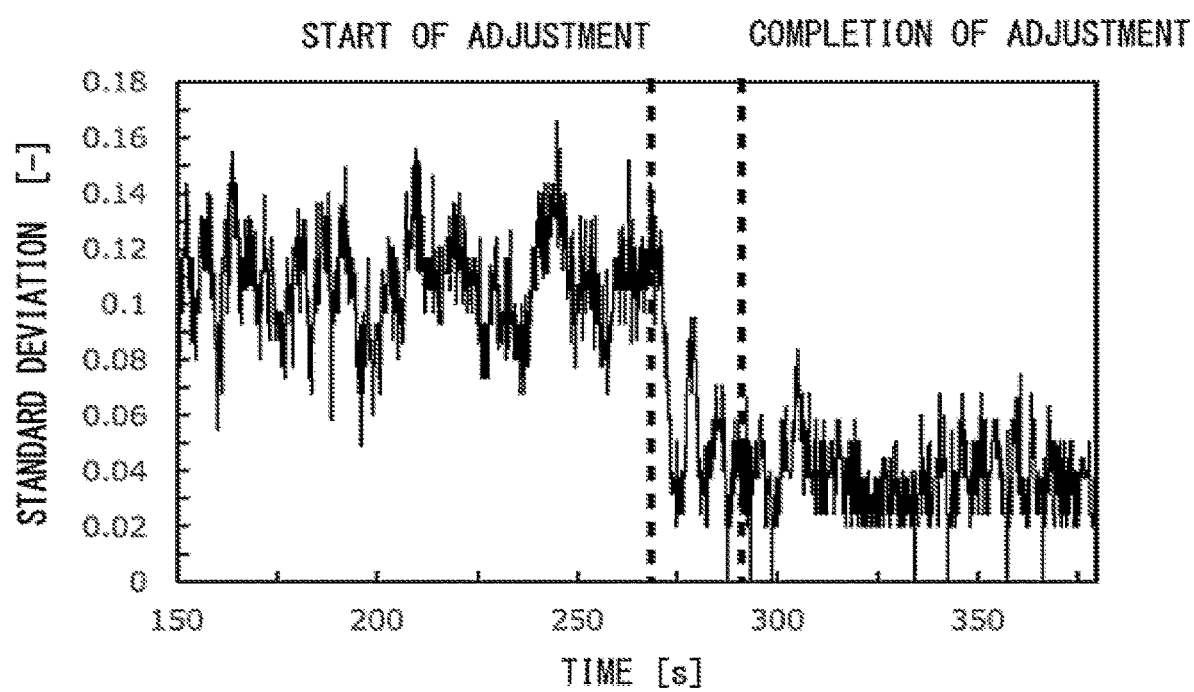
FIG. 8 is a graph showing a result of an experiment in which the effect of reducing variations among diameters of resin strands extruded from respective outflow holes in the strand manufacturing apparatus according to the first embodiment was verified.

FIGS. 7 and 8 are graphs showing results of the experiment in which the effect of reducing variations among diameters of resin strands extruded from the respective outflow holes 11a was verified. FIG. 7 shows changes in the strand diameters of the resin strands St1 to St5 over time before and after the adjustment of the opening of the outflow holes 11a. FIG. 8 shows changes in the standard deviation over time before and after the adjustment of the opening of the outflow holes 11a.

As shown in FIG. 7, before the adjustment was started, while the diameters of the resin strands St2 to St5 fluctuated in a rage of 4.2 to 4.4 mm, only the diameter of the resin strand St1 fluctuates in a range of 3.95 to 4.15 mm. As the opening of the outflow holes 11a was adjusted in such a situation, all of the diameters of the resin strands St1 to St5 fluctuated in a range of 4.2 to 4.4 mm after the completion of the adjustment. Further, as shown in FIG. 8, the standard deviation also significantly decreased after the completion of the adjustment as compared to that before the start of the adjustment. As described above, it has been verified that the strand manufacturing apparatus 10 according to this embodiment has an effect of reducing variations among diameters of resin strands extruded from the respective outflow holes 11a.

The control unit 14 shown in FIG. 1 may be configured so as to control the amount of the resin raw material supplied to the feeder 18, which supplies the resin raw material to the extruder 1, based on information about the diameters of the resin strands acquired by the diameter acquisition unit 13. There are cases in which although variations among diameters of resin strands extruded from respective outflow holes 11a are kept at a low level, the diameters of the resin strands become larger or smaller than a desired diameter as a whole. In the case where the diameters of the resin strands extruded from the respective outflow holes 11a acquired by the diameter acquisition unit 13 are larger than the desired diameter, it is possible to reduce the diameters of the resin strands as a whole by reducing the amount of the resin material supplied from the feeder 5 to the extruder 1. On the other hand, in the case where the diameters of the resin strands extruded from the respective outflow holes 11a acquired by the diameter acquisition unit 13 are smaller than the desired diameter, it is possible to increase the diameters of the resin strands as a whole by increasing the amount of the resin material supplied from the feeder 5 to the extruder 1. By adjusting the amount of the resin raw material supplied from the feeder 5 to the extruder 1 based on the information about the diameters of the resin strands acquired by the diameter acquiring section 13 as described above, it is possible to adjust the diameters of the resin strands more accurately.

Modified Example 1

Figure 9:
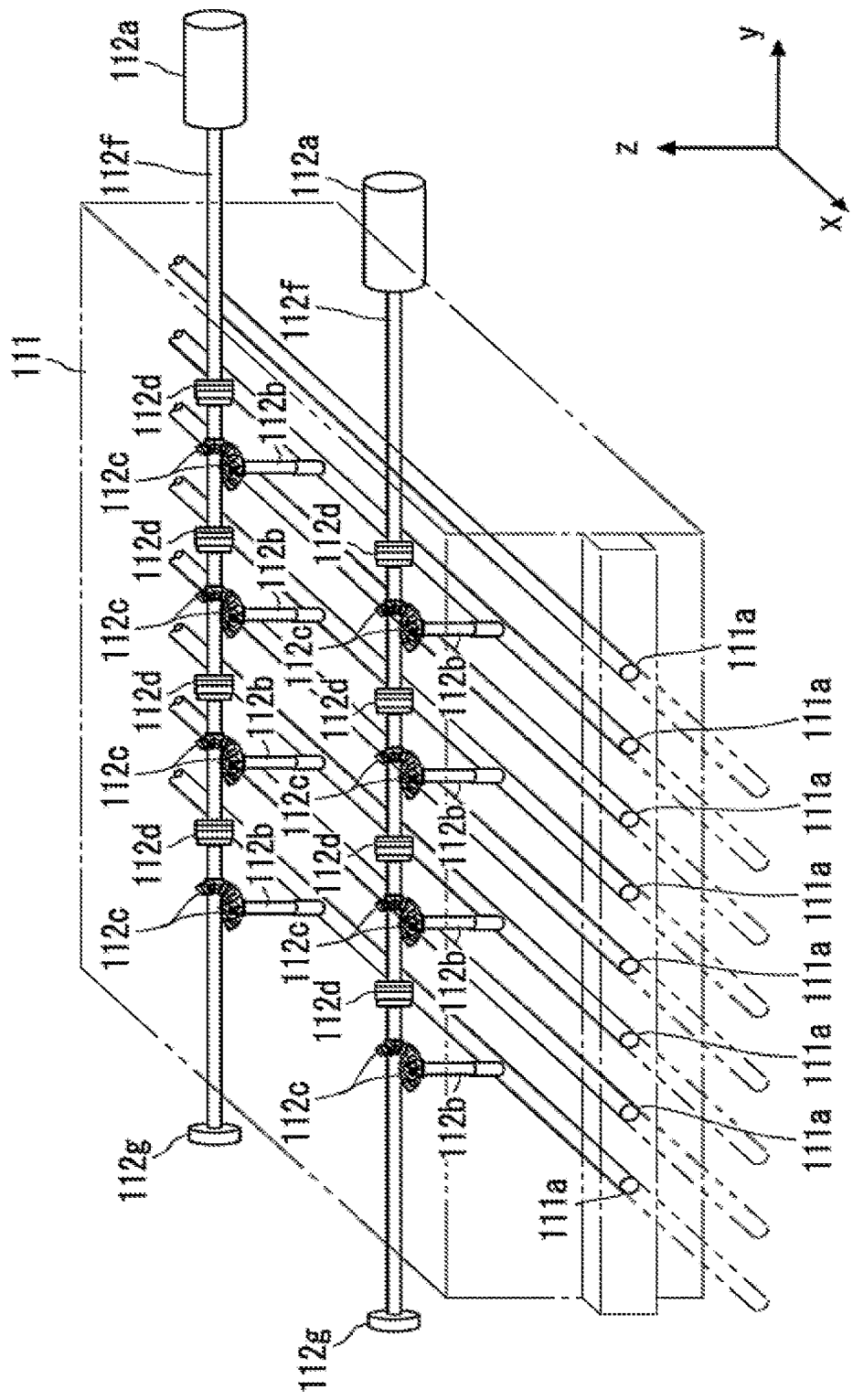
FIG. 9 is a diagram for explaining a configuration of adjustment valves according to a modified example 1.

Adjustment valves according to a modified example 1 having a configuration different from that of the adjustment valves 12 described above with reference to FIGS. 2 and 3 will be described. FIG. 9 is a diagram for explaining a configuration of adjustment valves 112 according to the modified example 1. As shown in FIG. 9, the adjustment valves 112 include rotary actuators 112a, screw members 112b, bevel gears 112c, clutches 112d, and so on. The screw members 112b are connected to shafts 112f, which are rotated by the rotary actuators 112a, through the bevel gears 112c and the clutches 112d. The end of each of the shafts 112*f* opposite to the end thereof connected to the rotary actuator 112*a* is supported by a bearing 112*g*. The screw members 112*b* are screwed into respective threaded holes formed in the die 111. The configuration of the die 111 is the same as that of the die 11 except that the threaded holes are formed instead of the pin holes 11*c* in the die 11.

The screw members 112*b* are attached to the die 111 so that the opening of the outflow holes 111*a* can be adjusted by rotating the screw members 112*b* using the rotary actuators 112*a*. These components are configured so that the rotation-axis direction of the screw members 112*b* is made perpendicular to the rotation-axis direction of the rotary actuators 112*a* by using the bevel gears 112*c*. A plurality of screw members 112*b* are connected to the rotation shaft of one rotary actuator 112*a*. When it is desired to rotate one of the plurality of screw members 112*b*, the clutches 112*d* corresponding to the other screw members 112*b* are disconnected so that the power of the rotary actuator 112*a* is not transmitted to the other screw members 112*b*.

Figure 10A:
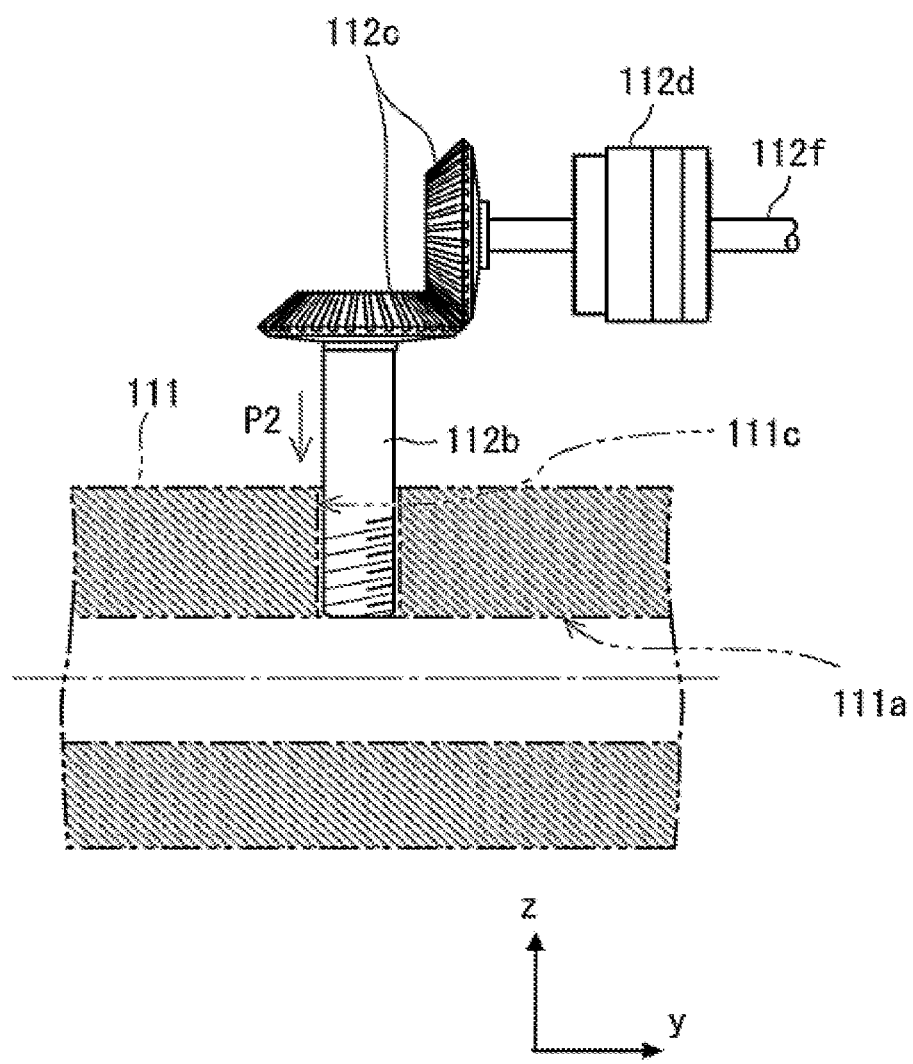
FIG. 10A is a diagram for explaining an operation for adjusting the opening of an outflow hole in an adjustment valve according to the modified example 1.
Figure 10B:
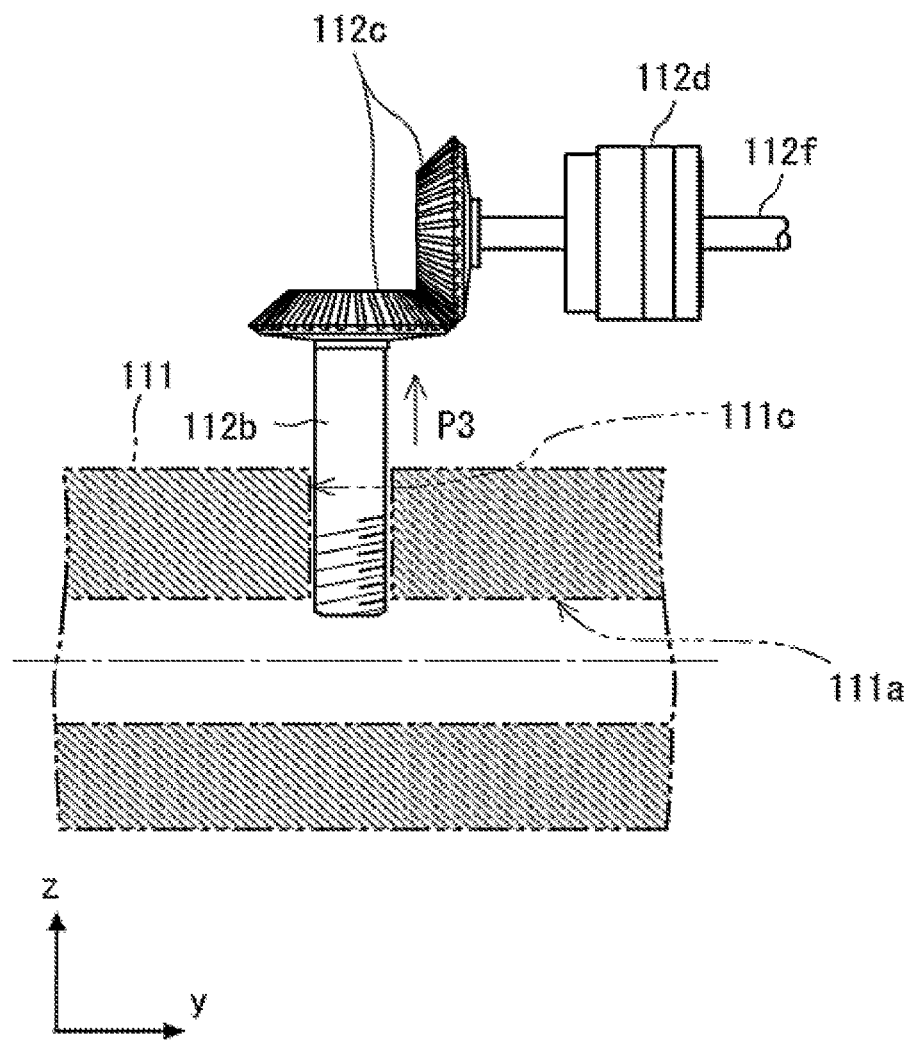
FIG. 10B is a diagram for explaining an operation for adjusting the opening of an outflow hole in an adjustment valve according to the modified example 1.

FIGS. 10A and 10B are diagrams for explaining an operation for adjusting the opening of an outflow hole 111*a* in an adjustment valve 112. As shown in FIGS. 10A and 10B, in the die 111, the screw hole 111*c* is inclined from the outflow hole 111*a* (in this example, inclined from the outflow hole 111*a* by an angle of) 90°, and is formed so as to communicate with the upper side of the outflow hole 111*a* at one end thereof. In the state shown in FIG. 10A, the tip of the screw member 112*b* does not protrude into the outflow hole 111*a*. When the screw member 112*b* is rotated clockwise from this state by the rotary actuator 112*a* (see FIG. 9), the tip of the screw member 112*b* moves in a direction indicated by an arrow P2 and hence the tip of the screw member 112*b* protrudes into the outflow hole 111*a* as shown in FIG. 10B. As a result, the cross section of the flow path of the outflow hole 111*a* decreases. On the other hand, when the screw member 112*b* is rotated counterclockwise from the state shown in FIG. 10B by the rotary actuator 112*a* (see FIG. 9), the tip of the screw member 112*b* moves in a direction indicated by an arrow P3 and hence the part of the tip of the screw member 112*b* that protrudes into the outflow hole 111*a* decreases. As a result, the cross section of the flow path of the outflow hole 111*a* increases. As described above, the moving distance of the screw member 112*b* changes according to the moving distance of the rotary actuator 112*a* (see FIG. 9) and, as a result, the opening of the outflow hole 111*a* is adjusted.

In the adjustment valves 112 according to the modified example 1, it is possible to adjust the opening of the outflow holes 111*a* more accurately. Further, in the adjustment valves 112 according to the modified example 1, it is possible to effectively prevent the resin material from leaking from parts other than the mouths at the outlet ends of the outflow holes 111*a*.

Second Embodiment

A second embodiment will be described hereinafter with reference to the drawings.

Figure 11:
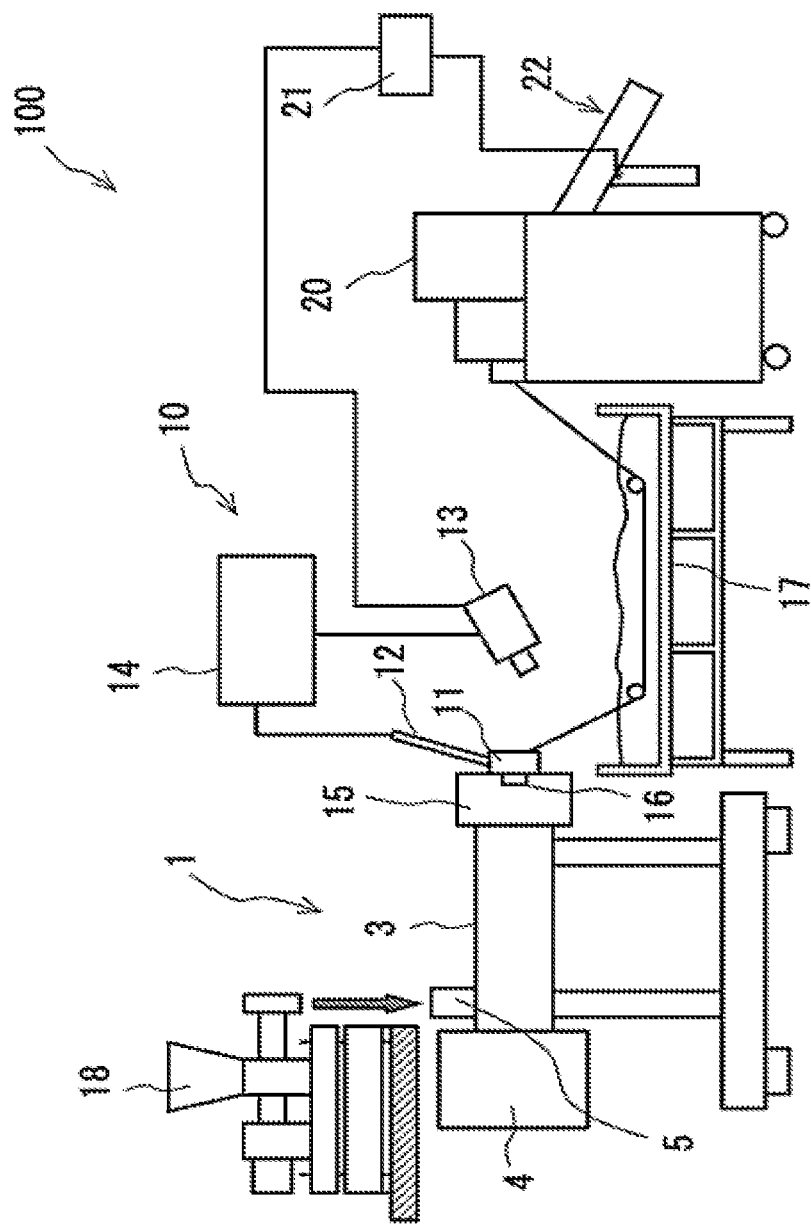
FIG. 11 is a schematic diagram of a configuration of an extruder and a pellet manufacturing apparatus according to a second embodiment.

FIG. 11 is a schematic diagram of a configuration of an extruder and a pellet manufacturing apparatus according to the second embodiment. As shown in FIG. 11, the pellet manufacturing apparatus 100 includes the strand manufacturing apparatus 10 described above in the first embodiment, a strand cutting unit 20, a foreign-substance infiltration detection unit 21, and a sorting unit 22.

The strand cutting unit 20 generates resin pellets by cutting resin strands solidified in the cooling tank 17 of the strand manufacturing apparatus 10 to a desired length. The foreign-substance infiltration detection unit 21 detects a part of the resin strand where a foreign substance has entered from an image acquired by the image acquisition unit 13. Note that in the pellet manufacturing apparatus 100, the foreign-substance infiltration detection unit 21 may be included in the control unit 14. The sorting unit 22 sorts the pellets so that pellets that have been cut out from a part of the resin strand including the part thereof where a foreign substance has entered are removed.

Figure 12:
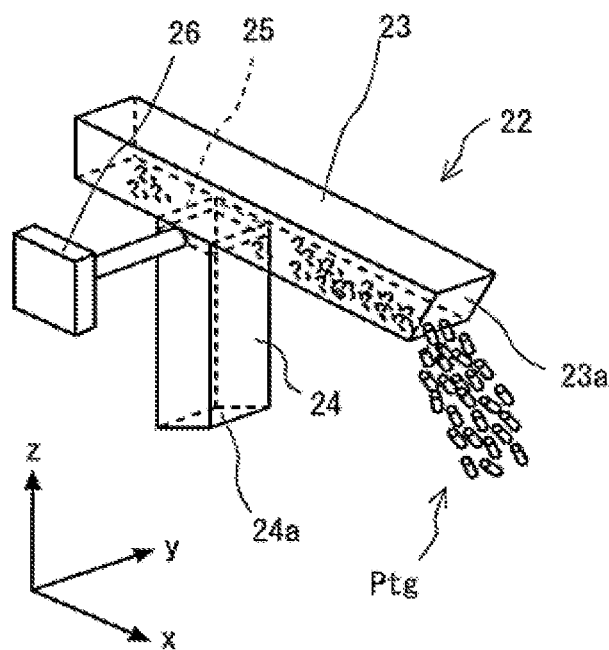
FIG. 12 shows details of a configuration of a sorting unit of the pellet manufacturing apparatus according to the second embodiment.
Figure 12:
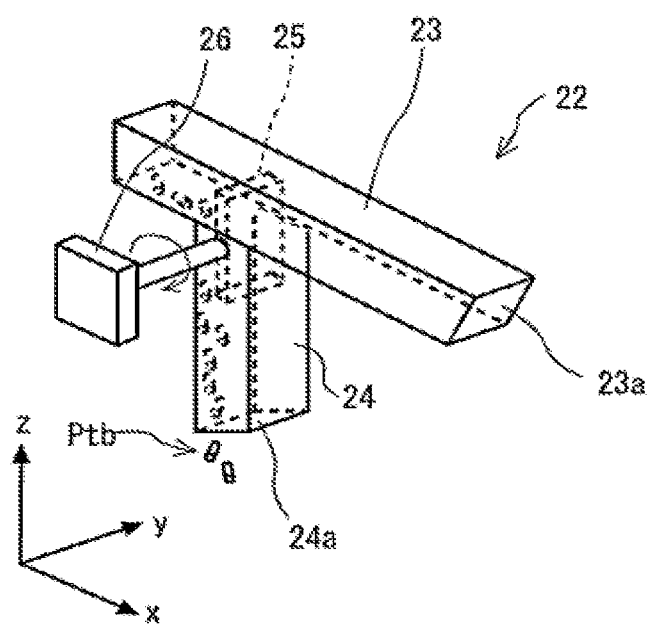

FIG. 12 shows details of a configuration of the sorting unit 22. As shown in FIG. 12, the sorting unit 22 includes a main flow path 23, a removal flow path 24, a partition plate 25, and a rotary actuator 26. The removal flow path 24 is a flow path for removing pellets that have been cut out from a part where the infiltration of a foreign substance is detected, and is branched from the under side of the main flow path 23. The partition plate 25 is disposed at the boundary between the main flow path 23 and the removal flow path 24. The partition plate 25 is rotated by the rotary actuator 26.

Figure 13:
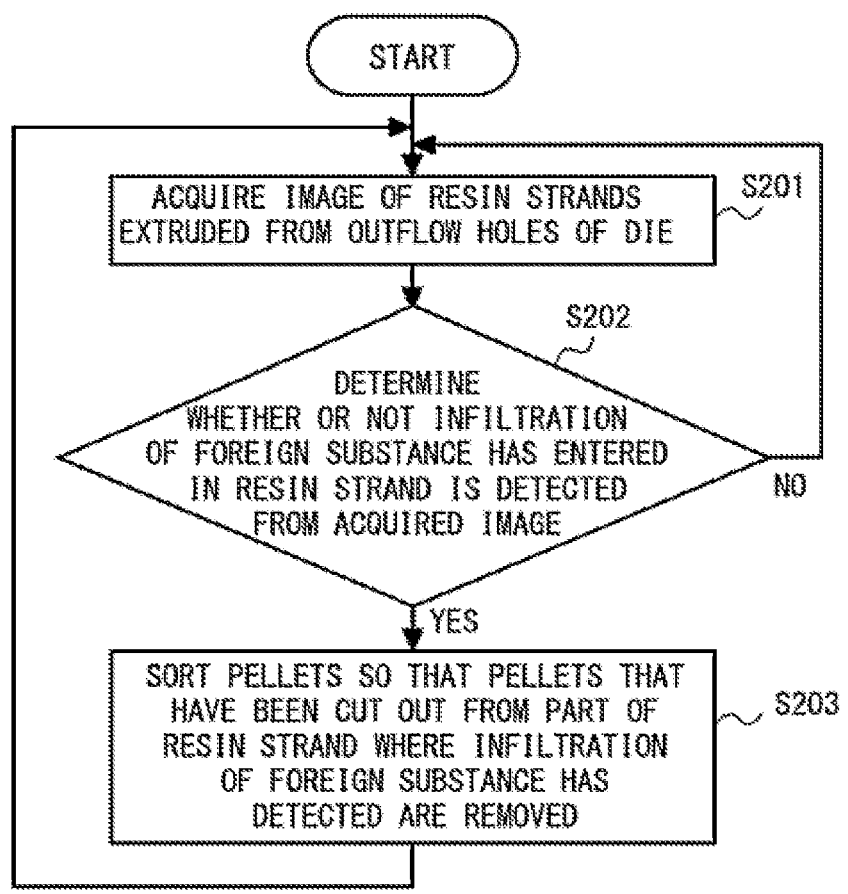
FIG. 13 is a flowchart showing a flow of processes for removing pellets containing foreign substances in the pellet manufacturing apparatus according to the second embodiment.

As shown in the upper part of FIG. 12, when normal pellets Ptg, i.e., pellets that have been cut out from a part of the resin strand containing no foreign substance are made to pass through the sorting unit, the boundary between the main flow path 23 and the removal flow path 24 is partitioned (i.e., closed) by the partition plate 25. Therefore, the normal pellets Ptg are extruded from a main flow path outlet 23*a*. On the other hand, as shown in the lower part of FIG. 12, when defective pellets Ptb, i.e., pellets that have been cut out from a part of the resin strand containing a foreign substance are made to pass through the sorting unit, the partition plate 25 is rotated by the rotary actuator 26 and hence the main flow path 23 communicates with (i.e., is connected to) the removal flow path 24. Therefore, the defective pellets Ptb enter from the main flow path outlet 23*a* into the removal flow path 24 and are extruded from a removal flow path outlet 24*a*. Next, a flow of processes for removing pellets containing foreign substances will be described. Note that in the following description, FIGS. 11 and 12 are also referred to as required. FIG. 13 is a flowchart showing a flow of processes for removing pellets containing foreign substances. As shown in FIG. 13, firstly, the image acquisition unit 13 acquires an image of resin strands extruded from the outflow holes 11*a* of the die 11 (step S201). Next, the foreign-substance infiltration detection unit 21 determines whether or not a part in the resin strand where a foreign substance has entered is detected from the acquired image (step S202). When a part in the resin strand where a foreign substance has entered is detected in the step S202, the sorting unit 22 sorts the pellets so that pellets that have been cut out from a part of the resin strand including the part thereof where the foreign substance has entered are removed (step S203). Then, the process returns to the step S201. When no part where a foreign substance has entered in the resin strand is detected in the step S202, the process returns to the step S201.

Figure 14:
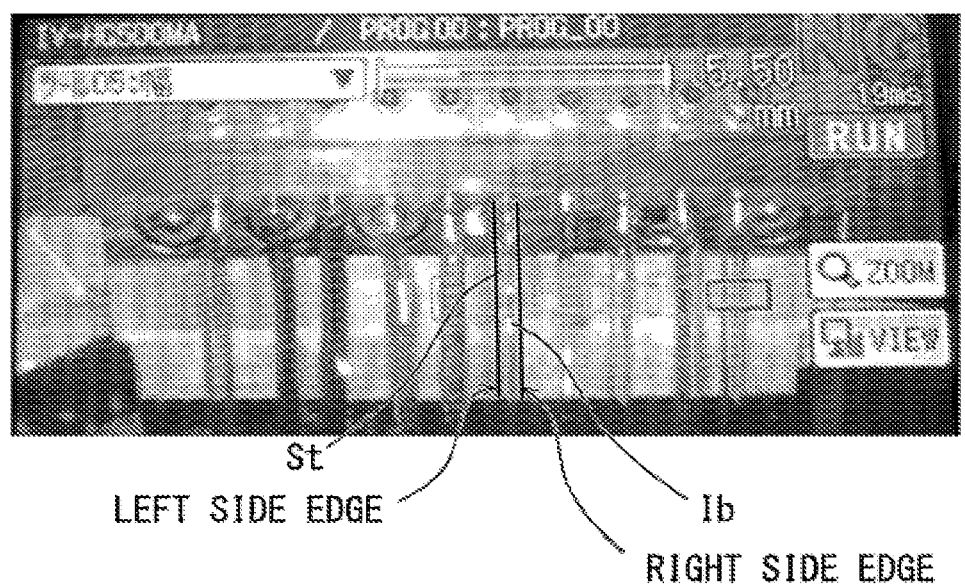
FIG. 14 is a photograph for explaining a process for detecting a part where a foreign substance enters from an acquired image in a step S202 shown in FIG. 13.

FIG. 14 is a photograph for explaining a process for detecting a part where a foreign substance has entered from an acquired image in the step S202 in FIG. 13. As shown in FIG. 14, in an area of the resin strand St specified in the image (an area between the left and right side edges), a part having a lower luminance (i.e., a darker part) than that of the normal resin strand, i.e., the resin strand containing no foreign substance is detected as a part Ib where a foreign substance has entered.

By doing so, it is possible to accurately remove pellets containing foreign substances.

Note that the present disclosure is not limited to the above-described embodiments and they can be modified as desired without departing from the spirit of the present disclosure. The plurality of examples described above may be combined with one another as desired. The actuator, which serves as the driving source of the adjustment valve, is not limited to the linear actuator and the rotary actuator described above in the above-described embodiments. That is, the actuator may be, for example, a hydraulic cylinder or a pneumatic cylinder.

The first and second embodiments can be combined as desirable by one of ordinary skill in the art.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A pellet manufacturing apparatus comprising:
    a strand manufacturing apparatus comprising:
        a die in which a plurality of outflow holes for discharging a molten resin material as string-shaped resin strands are formed;
        an adjustment valve configured to adjust openings of the outflow holes;
        an imager, positioned downstream from the die, and configured to acquire an image of the resin strands extruded directly from the outflow holes; and
        an opening adjustment device configured to adjust the openings of the outflow holes by driving the adjustment valve based on diameters of the resin strands in the image, wherein the opening adjustment device is configured to calculate an average and a standard deviation of the diameters of the resin strands extruded from respective outflow holes, and when the standard deviation is larger than a predefined predetermined value, determines an opening of each of the outflow holes according to a difference between a diameter of each resin strand extruded from a respective outflow hole and the average;
    a strand cutting device configured to generate pellets having a desired length from the resin strands;
    a foreign-substance infiltration detector configured to detect a part in the resin strands where a foreign substance has entered from the image; and
    a sorter configured to sort the pellets so that pellets that have been cut out from parts of the resin strands including the part thereof where the foreign substance has entered, which is detected by the foreign-substance infiltration detector, are removed.

* * * * *